Patented Sept. 8, 1953

2,651,633

UNITED STATES PATENT OFFICE 2,651,633

QUINAZOLONE COMPOUNDS AND METHODS OF MAKING THE SAME

Bernard R. Baker, Nanuet, N. Y., and Merle V. Querry, Westwood, N. J., assignors to American Cyanamid Company, New York, N. Y., a corporation of Maine No Drawing. Application January 29, 1951, Serial No. 208,432

17 Claims. (Cl. 260—251)

This invention relates to new 4-quinazolone compounds and derivatives having a beta-delta-diketo substituent on the 3 position thereof and methods of making the same.

The new class of quinazolone compounds of this invention, when in the form of their free organic bases, may be represented by the following formula:

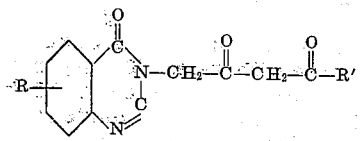

in which R is hydrogen or at least one substituent on the quinazolone nucleus and R' is an organic radical connected to the carbonyl group by a carbon to carbon linkage.

The substituent or substituents represented by R in the above formula may vary within wide limits and may be on one or more of the two, five, six, seven or eight positions of the quinazolone nucleus. Substituents of the following types are of value: halogen, for instance Cl, Br, and Fl; alkoxy and aryloxy, for instance —OCH₂, —OC₂H₅, —OCH₂C₆H₅, and —OC₆H₅; hydroxyl radicals; lower alkyl radicals, for instance methyl, ethyl, propyl and butyl; aryl radicals, for instance phenyl and substituted phenyl radicals; acyl radicals, for instance —COR in which R is hydrogen or lower alkyl; acyloxy radicals, for instance —OCOR in which R may represent H or lower alkyl; carboxyl radicals (—COOH) and the esters, amides and salts thereof.

The radical represented by R' in the above general formula is preferably a saturated or unsaturated aliphatic radical which may be unsubstituted or may have a wide variety of substituents. Suitable aliphatic radicals may be illustrated by the following: alkyl radicals, for instance methyl, ethyl, propyl and butyl; alkenyl radicals, for instance vinyl, allyl and hexenyl. The following illustrate groups with which the aliphatic radical may suitably be substituted: alkoxy, for instance methoxy and ethoxy; aryloxy, for instance phenoxy; halogen, for instance chlorine and bromine; cyano; carbalkoxy, for instance carbethoxy and carbomethoxy; acylated amino groups, for instance acetamido, carbobenzoxyamino, carbethoxyamino, benzamido and phthalimido. In addition to substituted and unsubstituted aliphatic radicals, R' may represent other organic radicals capable of being attached to a carbonyl group by a carbon to carbon linkage as illustrated by the following: heterocyclic radicals, for instance furyl.

There is evidence to indicate that the new compounds of this invention are tautomeric substances and may sometimes exist, at least partially, in one or more enolic forms. Such tautomerism may be illustrated by the following equation:

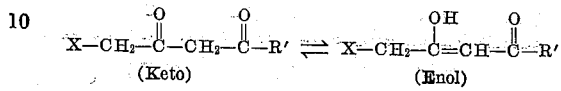

in which X represents a quinazolone nucleus and R' is as defined above. As is well understood by those skilled in the art, such tautomerism is due to a shifting proton and the keto and enol are not two different compounds but are two different forms of the same compound. The existence of a shifting proton in a compound cannot be clearly shown by a single formula and therefore, in this specification and claims, the general practice has been followed and the diketo type of structural formula is employed to represent the new compounds regardless of the fact that they may exist in part in enol form.

Typical of nitrogen bases, the new quinazolone compounds of this invention form salts with acids. For instance, the new compounds may be isolated as the hydrochloride and this salt used in place of the free base in subsequent reactions. Typical of many tautomeric substances, the new compounds also form metal salts, for instance with the alkali metals, the alkaline earth metals or even with less reactive metals. In fact, the copper salts of the new compounds are quite valuable and offer an excellent means of isolation and purification.

The new compounds of this invention are useful in organic synthesis, for instance as dye intermediates or as intermediates in the preparation of pharmaceuticals. For example, the new compounds may readily be employed in the manufacture of certain compounds having anti-malarial activity. It is intended, however, that this invention cover the new compounds per se and it is not to be construed as being limited to any particular field of utility.

While it is not intended that this invention be limited to quinazolone compounds made by any specific process, a particularly convenient method of preparing the new compounds has been discovered and this new method also constitutes a part of this invention. The new method comprises reacting a 4-quinazolone-3-acetic acid ester with a methyl ketone in the presence of a condensing agent as illustrated by the following general equation:

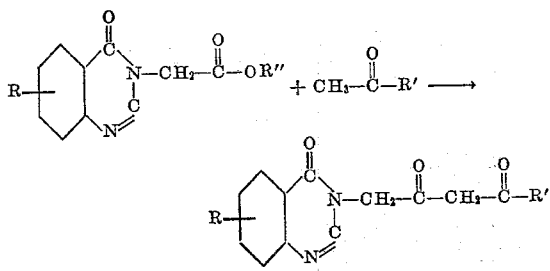

in which R and R' are as defined above and R'' is an esterifying radical such as illustrated by the following: lower alkyl, for instance methyl, ethyl, and butyl; aromatic, for instance phenyl; aralkyl, for instance benzyl. Condensing agents suitable for the process of this invention are alkali metal alcoholates, for instance sodium methoxide; alkali metal amides, for instance sodamide; and the alkali metals, for instance metallic sodium and lithium. If the reaction is to be carried to completion, the condensing agent should be present in a molar quantity equal to at least the 4-quinazolone-3-acetic acid ester for as the diketone is formed, it in effect removes an equal molar quantity of the condensing agent from the reaction mixture by salt formation. Best results will be obtained if the condensing agent is present in a molar ratio of one and one-half to two times that of the 4-quinazolone-3-acetic acid ester.

In general, it will be found convenient to perform the reaction in an inert solvent or diluent. Suitable solvents are aromatic hydrocarbons, for instance toluene, benzene, and xylene; aliphatic hydrocarbons, for instance n-octane; ethers, for instance dioxane. In some instances, better results are obtained if a small amount, for instance an amount equal in weight to about the weight of the condensing agent, of a lower aliphatic alcohol is added to the reaction mixture to increase the solubility of the condensing agent in the solvent or diluent.

The reaction may be carried out satisfactorily at room temperature or even at lower temperatures, for instance 0° C. However, higher temperatures favor the reaction and the reaction may advantageously be performed at temperatures between 50–85° C. While convenience would ordinarily limit one to the boiling temperature of the solvent employed, for instance 138° C. in the case of xylene, the reaction may, if desired, be carried out at temperatures up to the decomposition temperature of the reactants or reaction product.

The reaction proceeds immediately at room temperature and in most instances is substantially complete in about forty-eight hours. The reaction in most instances is substantially complete in about one to two hours at about 80° C., and in a proportional length of time at intermediate temperature.

The invention will be more particularly described by the following examples in which all parts are by weight unless otherwise specified:

*Example I*

To a solution of 10 parts by weight of 4-quinazolone and 3.7 parts by weight of sodium methoxide in 100 parts by volume of absolute alcohol there is added 7.2 parts by volume of ethyl chloroacetate. The mixture is refluxed two hours, diluted with water and extracted with chloroform. The extracts are evaporated to dryness in vacuo. Crystallization of the residue from heptane gives about 12 parts by weight of white crystals of ethyl 4-quinazolone-3-acetate having a melting point of 76–77° C.

A mixture of 2 parts by weight of ethyl 4-quinazolone-3-acetate, 0.77 part by volume of methyl ethyl ketone, 0.5 part by weight of sodium methoxide and 20 parts by volume of benzene is refluxed for two hours. The mixture is acidified with acetic acid, diluted with ethyl acetate and washed successively with water, aqueous sodium bicarbonate and water. Evaporation of the organic solvent leaves an oil which gives a red ferric chloride test. The oil is dissolved in a mixture of ethyl acetate and ether and shaken with 20 parts by volume of 10% aqueous cupric acetate. The copper salt or 3-(beta,delta-diketohexyl)-4-quinazolone crystallizes as green crystals having a melting point of 225–227° C. with decomposition. This compound is insoluble in common organic solvents.

*Example II*

A mixture of 46.4 parts by weight of ethyl 4-quinazolone-3-acetate, 400 parts by volume of benzene, 20 parts by volume of acetone, 24 parts by volume of absolute ethanol and 12 parts by weight of sodium methoxide is heated to boiling. After standing one-half hour the mixture is acidified with 24 parts by volume of acetic acid and washed twice with water. The separated organic layer is concentrated in vacuo until the product begins to separate, then it is diluted with an equal volume of heptane to yield 3-(beta,delta-diketoamyl)-4-quinazolone as white crystals having a melting point of about 130–130.5° C., which give a red ferric chloride test. This compound is insoluble in water or heptane, moderately soluble in cold benzene, or alcohol, but soluble in hot benzene, hot alcohol or chloroform. The copper derivative forms blue-green crystals having a melting point of about 260° C. with decomposition.

*Example III*

A solution of 6.0 parts by weight of sodium methoxide, 24 parts by volume of methyl acetoacetate and 30 parts by weight of gamma-bromopropylphthalimide (Ber., 21, 2671) in 1500 parts by volume of methanol is refluxed for sixteen hours, then 300 parts by volume of 3 N hydrochloric acid is added and the refluxing continued for four hours. The solution is concentrated in vacuo and the separating oil extracted with ethyl acetate. Evaporation of the extract gives crude 1-phthalimido-5-hexanone as an oil. When purified through its sodium bisulfite derivative, this compound forms white crystals having a melting point of 66–68° C. It is readily soluble in alcohol, acetone, ether or benzene but insoluble in water or petroleum ether.

A mixture of 49 parts by weight of crude 1-phthalimido-5-hexanone, 490 parts by volume of benzene, 29 parts by volume of absolute ethanol, 33.3 parts by weight of ethyl 4-quinazolone-3-acetate and 9.8 parts by weight of sodium methoxide is refluxed for one hour, then acidified with 40 parts by volume of acetic acid and washed with water. The organic solution is evaporated, the residue dissolved in ethyl acetate and shaken with 300 parts by volume of 10% cupric acetate. The copper derivative of 3-(beta,delta-diketo-omega-phthalimidooctyl)-4-quinazolone separates as blue green crystals having a melting point of about 235° C. with decomposition.

Example IV

A mixture of 11.4 parts by weight of sodium methoxide, 285 parts by volume of methanol, 45 parts by volume of methylacetoacetate and 57 parts by weight of gamma-bromopropylphthalimide is refluxed for eighteen hours, diluted with several volumes of water and extracted with chloroform. The combined extracts, evaporated to dryness in vacuo, leave a residue which is refluxed with 570 parts by volume of 6 N hydrochloric acid for nine hours. The cooled mixture is filtered from phthalic acid and the filtrate evaporated to dryness in vacuo. The residue of 1-amino-5-hexanone hydrochloride is dissolved in 168 parts by volume of water, then a solution of 14 parts by weight of sodium hydroxide in 84 parts by volume of water is added. The stirred mixture is treated dropwise with 20 parts by volume of benzoyl chloride over a period of ten minutes, then stirred twenty minutes longer. After the addition of 7 parts by weight of sodium hydroxide in 42 parts by volume of water and 5 parts by volume of benzoyl chloride, the mixture is stirred ten minutes more. The oil is extracted with benzene. Evaporation gives 26 parts by weight of crude 1-benzamido-5-hexanone.

A mixture of 13 parts by weight of crude 1-benzamido-5-hexanone, 4.1 parts by weight of sodium methoxide, 11 parts by volume of absolute ethanol, 13.7 parts by weight of ethyl 4-quinazolone-3-acetate and 130 parts by volume of benzene is refluxed for one hour, acidified with 5 parts by volume of acetic acid, diluted with ethyl acetate and washed with water. The organic layer is evaporated and the residue crystallized from ethyl acetate to yield white crystals of 3-(beta,delta-diketo-omega-benzamidooctyl)-4-quinazolone having a melting point of about 125-127° C. This compound gives a wine-red ferric chloride test and is soluble in hot alcohol or hot ethyl acetate, but insoluble in cold alcohol, ethyl acetate, water or petroleum ether.

Example V

The crude 1-amino-5-hexanone hydrochloride from 57 parts by weight of gamma-bromopropylphthalimide is treated with 44 parts by volume of benzylchlorocarbonate in place of benzoyl chloride of Example IV. The resulting 1-carbobenzoxyamino-5-hexanone is an oil which gives an orange 2,4-dinitrophenylhydrazone having a melting point of 106-108° C.

A solution of 5 parts by weight of 1-carbobenzoxyamino-5-hexanone, 3 parts by volume of absolute alcohol, 3.4 parts by weight of ethyl 4-quinazolone-3-acetate and 1 part by weight of sodium methoxide in 50 parts by volume of benzene is refluxed one hour, then acidified with 2 parts by volume of acetic acid and washed with water. The organic solution is evaporated to dryness, the residue dissolved in 40 parts by volume of alcohol and diluted with 30 parts by volume of 10% cupric acetate. The copper derivative of 3-(beta-delta-diketo-omega-carbobenzoxyaminooctyl)-4-quinazolone separates as blue crystals having a melting point of about 184-185° C. The compound is soluble in hot alcohol, but insoluble in water.

Example VI

The crude 1-amino-5-hexanone hydrochloride from 60 parts by weight of gamma-bromopropylphthalimide is treated with 23 parts by volume of ethyl chlorocarbonate in place of benzoyl chloride of Example IV. The resulting 1-carbethoxyamino-5-hexanone is obtained as an oil which gives a yellow 2,4-dinitrophenylhydrazone having a melting point of 128-129° C.

A mixture of 5 parts by weight of 1-carbethoxyamino-5-hexanone, 66 parts by volume of benzene, 4 parts by volume of absolute ethanol, 4.5 parts by weight of ethyl 4-quinazolone-3-acetate and 1.3 parts by weight of sodium methoxide is refluxed for one hour. The blue crystals of the copper salt of 3-(beta-delta-diketo-omega-carbethoxyaminooctyl)-4-quinazolone, melting at 208-210° C. with decomposition are isolated by the procedure of Example V. This compound is insoluble in the usual solvents.

Example VII

A mixture of 37 parts by weight of 4-phthalimidobutyric acid (Ber., 41, 513), 37 parts by volume of reagent ether (containing 0.5% pyridine) and 37 parts by volume of thionyl chloride is shaken occasionally for twenty minutes. The clear solution is evaporated to dryness in vacuo. The residual acid chloride, dissolved in 150 parts by volume of benzene, is added to a solution of 87 parts by volume of ethyl malonate and 48 parts by weight of magnesium methoxide in 300 parts by volume of benzene. After twenty minutes the mixture is treated with 16 parts by volume of acetic acid and washed with dilute hydrochloric acid and water. Solvent is distilled. To the residue, dissolved in 320 parts by volume of alcohol, there is added 320 parts by volume of 10% cupric acetate. The copper salt which separates, melting at 184-187° C., is shaken with chloroform and dilute hydrochloric acid. Evaporation of the chloroform gives ethyl (4-phthalimidobutyryl) malonate as an oil.

A mixture of 53 parts by weight of ethyl (4-phthalimidobutyryl) malonate, 60 parts by volume of alcohol and 265 parts by volume of 3N hydrochloric acid is refluxed for three hours. The solution is partially concentrated, in vacuo, diluted with water and extracted with ethyl acetate. The extract, washed with aqueous sodium bicarbonate and water, is evaporated to dryness leaving 1-phthalimido-4-pentanone as an oil.

A mixture of 24 parts by weight of 1-phthalimido-4-pentanone, 29 parts by weight of ethyl 4-quinazolone-3-acetate, 280 parts by volume of benzene, 22 parts by volume of absolute alcohol and 7.5 parts by weight of sodium methoxide is refluxed one hour, acidified with 15 parts by volume of acetic acid, diluted with ethyl acetate and washed with water. Addition of 210 parts by volume of 10% cupric acetate gives the copper derivative of 3-(beta,delta-diketo-omega-phthalimidoheptyl)-4-quinazolone as blue crystals having a melting point of 230-233° C. This compound is insoluble in common solvents.

Example VIII

A mixture of 40 parts by weight of ethyl (4-phthalimidobutyryl) malonate and 400 parts by volume of 6 N hydrochloride acid is refluxed for three hours, cooled, filtered and the filtrate evaporated to dryness in vacuo. The crude residual 1-amino-4-pentanone hydrochloride is disolved in 120 parts by volume of water, cooled to 5° C., diluted with 12.4 parts by weight of sodium hydroxide in 75 parts by volume of water and treated with 31.5 parts by volume of carbobenzoxy chloride. The mixture is stirred three hours, then allowed to stand overnight. The mixture is extracted with benzene. The combined extracts, washed with water, are evaporated to dryness leaving a residue of 1-carbobenzoxyamino-4-pentanone as an oil. The compound gives a yellow 2,4-dinitrophenylhydrazone having a melting point of 134–135° C.

A mixture of 5 parts by weight of 1-carbobenzoxyamino-4-pentanone, 50 parts by volume of benzene, 2.2 parts by volume of absolute alcohol, 3.6 parts by weight of ethyl 4-quinazolone-3-acetate and 1.1 parts by weight of sodium methoxide is refluxed for one hour, acidified with 2.1 parts by volume of acetic acid, washed with water and evaporated to dryness in vacuo. Dissolved in 45 parts by volume of ethyl acetate and treated with 35 parts by volume of 10% cupric acetate, the residue gives green crystals, melting at 182–184° C., of the copper salt of 3-(beta-delta - diketo - omega - carbobenzoxyaminoheptyl)-4-quinazolone.

Example IX

A mixture of 4.3 parts by weight of 5-ketocapronitrile (U. S. P. 2,381,371), 10.5 parts by weight of ethyl 4-quinazolone-3-acetate, 96 parts by volume of benzene, 8.1 parts by volume of absolute alcohol and 2.8 parts by weight of sodium methoxide is refluxed forty-five minutes, acidified with 5.6 parts by volume of acetic acid, diluted with ethyl acetate and washed with water. Evaporation of the organic layer gives an oil which is dissolved in 80 parts by volume of ethyl acetate and shaken with 80 parts by volume of 10% cupric acetate. The green crystals of the copper derivative 3 - (beta - delta - diketo-omega - cyanoheptyl) - 4 - quinazolone separate having a melting point of 237° C. with decomposition. This compound is insoluble in common solvents.

Example X

A mixture of 1.18 parts by volume of mesityl oxide, 2.8 parts by weight of ethyl 4-quinazolone-3-acetate, 15 parts by volume of benzene, 2.2 parts by volume of absolute alcohol and 0.75 part by weight of sodium methoxide is refluxed for one hour. The green copper derivative of 3-(2, 4 - diketo - 6 - methyl - 5 - heptenyl) - 4-quinazolone, having a melting point of 229–232° C. with decomposition is isolated according to the procedure of Example IX. This compound is insoluble in common solvents.

Example XI

A mixture of 23 parts by weight of ethyl 4-quinazolone-3-acetate, 10.9 parts by weight of allylacetone, 200 parts by volume of benzene, 12 parts by volume of absolute alcohol and 6 parts by weight of sodium methoxide is refluxed for one hour, then acidified with 12 parts by volume of acetic acid and washed with water. The benzene layer is evaporated. Crystallization of the residue from methanol gives 3-(2,4-diketo-7-octenyl)-4-quinazolone as white crystals having a melting point of 96–97° C. This compound is soluble in chloroform or hot methanol, but insoluble in cold methanol, water or petroleum ether and gives a red ferric chloride test.

The copper derivative forms blue crystals, melting at 244° C. with decomposition, which are insoluble in common solvents.

Example XII

To a mixture of 65.7 parts by weight of ethyl phenoxymalonate (J. Am. Chem. Soc., 62, 1154) in 66 parts by volume of t-butyl alcohol there is added 0.6 part by weight of sodium methoxide and 15.4 parts by volume of acrylonitrile. After ten minutes the mixture is heated at 100° C. under a condenser for one hour, acidified with 2 parts by volume of acetic acid, washed with water and distilled. The ethyl cyanoethyl phenoxymalonate boils at 158° C. (0.1 mm.) and is a colorless oil soluble in methanol, chloroform or benzene, but insoluble in water.

A mixture of 60 parts by weight of ethyl cyanoethyl phenoxymalonate and 120 parts by volume of diethyl carbitol is shaken with hydrogen at 100° C. and 2–3 atmospheres in the presence of Raney nickel for fifteen hours when two mol-equivalents of hydrogen are absorbed. The filtered solution is distilled at 10 mm. up to a bath temperature of 130° C. to obtain an oily residue of 3-phenoxy-3-carbethoxy-2-piperidone.

A mixture of 39 parts by weight of 3-phenoxy-3-carbethoxy-2-piperidone and 128 parts by volume of 6 N hydrochloric acid is refluxed for one hour, then evaporated to dryness in vacuo. The residual crude 2-phenoxy-5-aminovaleric acid hydrochloride is heated with 31.6 parts by weight of phthalic anhydride at 190–195° C. for fifty minutes. The cooled mixture, dissolved in ethyl acetate, is extracted with aqueous sodium bicarbonate. Acidification gives an insoluble gum which gradually solidifies. Recrystallization from benzene-heptane gives white crystals of 2-phenoxy-5-phthalimidovaleric acid having a melting point of 117–119° C.

A mixture of 23 parts by weight of 2-phenoxy-5-phthalimidovaleric acid, 45 parts by volume of reagent ether (containing 0.5% pyridine) and 23 parts by volume of thionyl chloride is refluxed for one hour, then evaporated to dryness in vacuo. The residual acid chloride dissolved in 55 parts by volume of toluene is added to a solution of 32 parts by volume of ethyl malonate and 15.3 parts by weight of magnesium methoxide in 75 parts by volume of toluene over a period of fifteen minutes. After fifteen minutes more the mixture is acidified with 14 parts by volume of acetic acid and 53 parts by volume of 3 N hydrochloric acid. The organic layer is washed with water, evaporated and the excess malonic ester distilled out at 0.1 mm. to obtain an oily residue of ethyl (2-phenoxy-5-phthalimidovaleryl) malonate which gives a red ferric test.

A mixture of 18 parts by weight of ethyl (2-phenoxy-5-phthalimidovaleryl) malonate and 180 parts by volume of 6 N hydrochloric acid is refluxed for five hours. The insoluble oil is extracted with benzene. Evaporation of the benzene and crystallization of the residue from methanol gives white crystals of 1-phthalimido-4-phenoxy-5-hexanone having a melting point of 97–98° C.

A mixture of 2.6 parts by weight of 1-phthalimido-4-phenoxy-5-hexanone, 26 parts by volume of benzene, 2.1 parts by weight of ethyl 4-quinazolone-3-acetate, 1.7 parts by volume of absolute alcohol and 0.56 part by weight of sodium methoxide is refluxed for one hour, acidified with 1.2 parts by volume of acetic acid and washed with water. Evaporation of the organic layer leaves an oil which is dissolved in 48 parts by volume of alcohol and treated with 8 parts by volume of 10% cupric acetate. The green crystals of the copper derivative of 3-(2,4-diketo-5-phenoxy-8-phthalimidooctyl)-4-quinazolone separate; melting point about 140–145° C. with decomposition. This compound is soluble in chloroform or hot

Example XIII

To a solution of 11 grams of 5-methyl-4-quinazolone (Ber., 52, 1084) and 3.7 grams of sodium methoxide in 100 parts by volume of absolute alcohol there is added 7.2 parts by volume of ethyl chloroacetate. The mixture is refluxed two hours, diluted with water and extracted with chloroform. Evaporation of the extracts to dryness in vacuo and crystallization of the residue from heptane gives ethyl 5-methyl-4-quinazolone-3-acetate.

The copper derivative of 3-(2,4-diketo-5-phenoxy-8-phthalimidooctyl)-5-methyl-4-quinazolone is prepared by the procedure of Example XII but using 2.2 grams of ethyl 5-methyl-4-quinazolone-3-acetate in place of the ethyl-4-quinazolone-3-acetate of that example.

Example XIV

A solution of 23.6 parts by weight of 4-chloro-7-methoxyisatin (Helv. chim. acta, 2, 239) in 200 parts by volume of 5% sodium hydroxide is treated with 30 parts by volume of 30% hydrogen peroxide over a period of ten minutes. After ten minutes more the solution is clarified with activated carbon (Norit) and neutralized with hydrochloric acid. The 3-methoxy-6-chloroanthranilic acid precipitates and after recrystallization from aqueous methanol, has a melting point of about 145–146° C.

A mixture of 12 parts by weight of 3-methoxy-6-chloroanthranilic acid in 5 parts by volume of formamide is heated at about 130–135° C. for forty-five minutes and at 175° C. for seventy-five minutes. Addition of 8.5 parts by volume of 2-methoxyethanol and 85 parts by volume of water gives 5-chloro-8-methoxy-4-quinazolone which forms, on recrystallization from 2-methoxyethanol, white crystals having a melting point of about 311–313° C. with decomposition.

To a solution of 13.8 grams of 5-chloro-8-methoxy-4-quinazolone and 3.7 grams of sodium methoxide in 100 parts by volume of absolute alcohol there is added 7.2 parts by volume of ethyl chloroacetate. The mixture is refluxed two hours, diluted with water and extracted with chloroform. Evaporation of the extracts to dryness in vacuo and crystallization of the residue from heptane gives ethyl-5-chloro-8-methoxy-4-quinazolone.

The copper derivative of 3-(2,4-diketo-5-phenoxy-8-phthalimidooctyl)-5-chloro-8-methoxy-4-quinazolone is prepared by the procedure of Example XII but using 2.7 grams of ethyl 5-chloro-8-methoxy-4-quinazolone-3-acetate in place of the ethyl 4-quinazolone-3-acetate of that example.

Example XV

Fusion of 16 parts by weight of 6-chloroanthranilic acid (Monats. 22, 488) with 14 parts by volume of formamide according to the procedure of Example XIV gives approximately 13 parts by weight of tan crystals of 5-chloro-4-quinazolone having a melting point of about 210° C. after recrystallization from aqueous 2-methoxyethanol.

To a solution of 12.4 grams of 5-chloro-4-quinazolone and 3.7 grams of sodium methoxide in 100 parts by volume of absolute alcohol there is added 7.2 parts by volume of ethyl chloroacetate. The mixture is refluxed two hours, diluted with water and extracted with chloroform. Evaporation of the extracts to dryness in vacuo and crystallization of the residue from heptane gives ethyl 5-chloro-4-quinazolone-3-acetate.

The copper derivative of 3-(2,4-diketo-5-phenoxy-8-phthalimidooctyl)-5-chloro-4-quinazolone is prepared by the procedure of Example XII but using 2.4 grams of ethyl 5-chloro-4-quinazolone-3-acetate in place of the ethyl 4-quinazolone-3-acetate of that example.

Example XVI

To a solution of 11 grams of 6-methyl-4-quinazolone (Ber., 34, 3776) and 3.7 grams of sodium methoxide in 100 parts by volume of absolute alcohol there is added 7.2 parts by volume of ethyl chloroacetate. The mixture is refluxed two hours, diluted with water and extracted with chloroform. Evaporation of the extracts to dryness in vacuo and crystallization of the residue from heptane gives ethyl 6-methyl-4-quinazolone-3-acetate.

The copper derivative of 3-(2,4-diketo-5-phenoxy - 8 - phthalimidooctyl) - 6 - methyl - 4 - quinazolone is prepared by the procedure of Example XII but using 2.2 grams of ethyl 6-methyl-4-quinazolone-3-acetate in place of the ethyl 4-quinazolone-3-acetate of that example.

Example XVII

To a solution of 7 parts by weight of sodium methoxide in 100 parts by volume of methanol there is added 20.6 parts by weight of 3-chloro-3-carbethoxy-2-piperidone (J. Am. Chem. Soc., 71, 2818, 1949). The solution is refluxed and stirred for ninety minutes, acidified with acetic acid and cooled. The salt is removed by filtration and the filtrate evaporated to dryness. About 20 parts by weight of water are added and the solution extracted with chloroform. The solvent is removed in vacuo and the residue distilled. The product is a colorless viscous oil having a boiling point of about 142–150° C. (0.15 mm.) which solidifies and melts at about 60–67° C. Several recrystallizations from benzene-petroleum ether give white crystals having a melting point of about 79.5–80° C., of 3-methoxy-3-carbomethoxy-2-piperidone. This compound is readily soluble in water, alcohol, acetone, and benzene, but insoluble in petroleum ether.

The above 3-methoxy-3-carbomethoxy-2-piperidone is converted to 1-phthalimido-4-methoxy-5-hexanone by the same procedure as employed in Example XII to convert 3-phenoxy-3-carbethoxy-2-piperidone to 1-phthalimido-4-phenoxy-5-hexanone.

A mixture of 1.6 parts by weight of 1-phthalimido-4-methoxy-5-hexanone, 18 parts by volume of benzene, 1.6 parts by weight of ethyl 4-quinazolone-3-acetate, 1.3 parts by volume of absolute alcohol and 0.43 part by weight of sodium methoxide is refluxed for one hour, acidified with 1.0 parts by volume of acetic acid and washed with water. Evaporation of the organic layer leaves an oil which is dissolved in 38 parts by volume of alcohol and treated with 6 parts by volume of 10% cupric acetate. Green crystals of the copper derivative of 3-(2,4-diketo-5-methoxy-8-phthalimidooctyl)-4-quinazolone separate which have a melting point of about 168–171° C. with decomposition.

Example XVIII

The copper derivative of 3-(2,4-diketo-5-methoxy-8 - phthalimidooctyl)-5-methyl-4-quinazolone is prepared by the procedure of Example XVII but using 1.7 parts by weight of ethyl 5-methyl-4-quinazolone-3-acetate (prepared by the procedure of Example XIII) in place of the ethyl 4-quinazolone-3-acetate of Example XVII.

*Example XIX*

The copper derivative of 3-(2,4-diketo-5-methoxy-8 - phthalimidooctyl)-5-chloro-4-quinazolone is prepared by the procedure of Example XVII but using 1.8 parts by weight of ethyl 5-chloro-4-quinazolone-3-acetate (prepared by the procedure of Example XIV) in place of the ethyl 4-quinazolone-3-acetate of Example XVII.

*Example XX*

A solution of 174 parts by weight of allylphthalimide (Ber., 23, 999) and 285 parts by weight of mercuric acetate in 1745 parts by volume of methanol is refluxed with stirring for ten minutes. A solution of 156 parts by weight of potassium iodide in 310 parts by volume of water is added and the mixture again refluxed ten minutes. Then 256 parts by weight of iodine is added. After being refluxed for fifteen minutes more a solution of 178 parts by weight of potassium iodide in 1260 parts by volume of water is added followed by sufficient sodium bisulfite to bleach the excess iodine. The mixture is diluted to 5000 parts by volume with water and cooled. The precipitate is recrystallized from alcohol giving white crystals of 2-methoxy-3-iodo-propylphthalimide having a melting point of 105–107° C.

A mixture of 47 parts by weight of sodium methoxide, 464 parts by volume of t-butyl alcohol, 243 parts by weight of 2-methoxy-3-iodo-propylphthalimide and 165 parts by volume of methyl acetoacetate is refluxed forty-two hours, then acidified with 47 parts by volume of acetic acid and evaporated to dryness in vacuo. The residue is refluxed with 555 parts by volume of alcohol and 555 parts by volume of 3 N hydrochloric acid for three hours, concentrated to about one-half volume in vacuo, diluted with water and extracted with ethyl acetate. The extract, washed with aqueous sodium bicarbonate and dried, is evaporated to dryness. The residual crude 1 - phthalimido - 2 - methoxy-5 - hexanone is about 30% pure. It is purified through its sodium bisulfite derivative with about 99% recovery. This ketone is an oil soluble in alcohol, ethyl acetate and benzene, but insoluble in water. Its 2,4-dinitrophenylhydrazone forms orange crystals having a melting point of 180.5–181° C.

A mixture of 41 parts by weight of 1-phthalimido-2-methoxy-5-hexanone and 410 parts by volume of 6 N hydrochloric acid is refluxed three hours, cooled, filtered and the filtrate evaporated to dryness in vacuo. The residual crude 1-amino-2-methoxy-5-hexanone hydrochloride is dissolved in 176 parts by volume of water and basified with a solution of 12.6 parts by weight of sodium hydroxide in 74 parts by volume of water. After the addition of 17.9 parts by volume of benzoyl chloride, the mixture is stirred twenty minutes. The mixture is treated with 6.3 parts by weight of sodium hydroxide in 22 parts by volume of water, then 4.5 parts by volume of benzoyl chloride is added and the stirring continued for thirty minutes more. The oil is removed by extraction with benzene. The combined extracts, washed with dilute acid and water, are evaporated leaving 26 parts by weight of 1-benzamido-2-methoxy-5-hexanone as an oil soluble in alcohol, benzene or acetone, but insoluble in water. The 2,4-dinitrophenylhydrazone forms yellow crystals having a melting point of about 132–134° C.

A mixture of 26 parts by weight of 1-benzamido-2 - methoxy - 5-hexanone, 28.5 parts by weight of ethyl 4-quinazolone-3-acetate, 260 parts by volume of benzene, 22 parts by volume of absolute alcohol and 7.6 parts by weight of sodium methoxide is refluxed for one hour, acidified with 15 parts by volume of acetic acid and washed with water. The organic layer is evaporated, the residue dissolved in 236 parts by volume of ethyl acetate and treated with 213 parts by volume of 10% cupric acetate. The blue crystals of the copper derivative of 3-(2,4-diketo-7-methoxy-8-benzamidooctyl)-4-quinazolone separate; melting point about 218–220° C. with decomposition. This compound is insoluble in common organic solvents.

*Example XXI*

A mixture of 4 parts by weight of acetanthranil (J. Am. Chem. Soc., 29, 529), 1.85 parts by weight of glycine and 4 parts by volume of diethyl carbitol is heated at 175–185° C. for fifteen minutes. Addition of 15 parts by volume of alcohol and cooling give white crystals of 2-methyl-4-quinazolone-3-acetic acid having a melting point of about 263° C. with decomposition after recrystallization from methyl Cellosolve.

To a suspension of 3 parts by weight of 2-methyl-4-quinazolone-3-acetic acid in 17 parts by volume of methanol there is added 1.7 parts by volume of acetyl chloride. The solution is refluxed for thirty minutes, cooled, diluted with water and neutralized with sodium bicarbonate. The mixture is extracted with chloroform. The extracts are evaporated and the residue recrystallized from benzene-heptane to give white crystals of methyl 2-methyl-4-quinazolone-3-acetate having a melting point of 114–115° C.

A mixture of 5.8 parts by weight of methyl 2-methyl-4-quinazolone-3-acetate, 7 parts by weight of 1-carbethoxyamino-5-hexanone (prepared by the procedure of Example VI), 83 parts by volume of benzene, 5 parts by volume of absolute alcohol and 1.7 parts by weight of sodium methoxide is refluxed for one hour. The blue crystals of the copper derivative of 2-methyl-3-(2,4 - diketo - 8 - carbethoxyaminooctyl) - 4 - quinazolone separate; melting point 201–202° C. with decomposition. This compound is insoluble in common solvents.

*Example XXII*

To a solution of 21 parts by weight of ethyl 4-quinazolone-3-acetate and 11 parts by weight of 2-acetofuran in 181 parts by volume of benzene and 11 parts by volume of absolute alcohol there is added 5.45 parts by weight of sodium methoxide. The solution is refluxed one hour, cooled, acidified with 11 parts by volume of acetic acid and washed with water. On standing the benzene solution deposited 3-(beta,delta-diketo-delta-furylbutyl)-4-quinazolone having a melting point of about 127–128° C. Recrystallization from toluene gives white crystals, having a melting point of 129–130° C., which are insoluble in water or petroleum ether, somewhat soluble in alcohol, toluene or benzene, but readily soluble hot in alcohol, chloroform, toluene or benzene.

We claim:

1. Compounds selected from the group consisting of those represented by the formula:

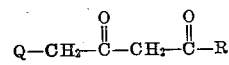

in which Q represents a 4-quinazolone nucleus having the beta,delta-diketo substituent in the 3 position, and R represents a member selected from the group consisting of aliphatic hydrocarbon radicals having not more than about five carbon atoms, monocyclic heterocyclic radicals containing a single ring oxygen as the only heterocyclic atom, and substituted alkyl radicals in which the alkyl group has not more than about five carbon atoms exclusive of substituents and having at least one substituent selected from the group consisting of halogen substituents, carbalkoxy groups, acylated amino groups, cyano groups, alkoxy groups, and aryloxy groups; and addition salts thereof with acids.

2. The 3-[2,4 - diketo - 5 - (lower alkoxy-8-(acylated amino)octyl]-4-quinazolones.

3. The 3 - [2,4 - diketo - 5 - (lower alkoxy) - 8 - (acylated amino)octyl]-5-halo-4-quinazolones.

4. The new compound 3-(2,4-diketo-5-methoxy-8-phthalimidooctyl)-5-chloro - 4 - quinazolone.

5. The 3 - [2,4 - diketo - 5 - (lower alkoxy) - 8 - (acylated amino)octyl]-5-(lower alkyl)-4-quinazolones.

6. The new compound 3-(2,4-diketo-5-methoxy-8-phthalimidooctyl) - 5 - methyl-4-quinazolone.

7. The 3 - [2,4 - diketo - 5 - aryloxy - 8 - (acylated amino)octyl]-4-quinazolones.

8. The new compound 3-(2,4-diketo-5-phenoxy - 8 - phthalimidooctyl) - 5 - chloro - 4 - quinazolone.

9. The new compound 3-(2,4-diketo-5-phenoxy - 8 - phthalimidooctyl) - 5 - methyl - 4 - quinazolone.

10. The 3 - (beta,delta - diketo - delta - furyl - butyl)-4-quinazolones.

11. The new compound 3-(beta,delta-diketo-delta-2-furylbutyl)-4-quinazolone.

12. A method of preparing compounds represented by the formula:

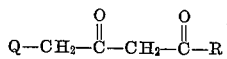

in which Q represents a 4-quinazolone nucleus having the beta,delta-diketo substituent in the 3 position, and R represents a member selected from the group consisting of aliphatic hydrocarbon radicals having not more than about five carbon atoms, monocyclic heterocyclic radicals containing a single ring oxygen as the only heterocyclic atom, and substituted alkyl radicals in which the alkyl group has not more than about five carbon atoms exclusive of substituents and having at least one substituent selected from the group consisting of halogen substituents, carbalkoxy groups, acylated amino groups, cyano groups, lower alkoxy groups, and aryloxy groups; and addition salts thereof with acids, which method comprises contacting a methyl ketone having the formula:

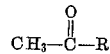

in which R is as defined above, with a 4-quinazolone-3-acetic acid ester in the presence of a condensing agent selected from the group consisting of alkali metal alkoxides, alkali metal amides, and alkali metals.

13. A method of preparing 3-(2,4-diketo-5-methoxy - 8 - phthalimidooctyl) - 5 - chloro - 4 - quinazolone which comprises contacting 1-phthalimido-4-methoxy-5-hexanone with ethyl 5-chloro-4-quinazolone-3-acetate in the presence of sodium methoxide.

14. A method of preparing the 3-(2,4-diketo-5-methoxy - 8 - phthalimidooctyl) - 5 - methyl - 4 - quinazolone which comprises contacting 1-phthalimido-4-methoxy-5-hexanone with ethyl 5-methyl-4-quinazolone-3-acetate in the presence of sodium methoxide.

15. A method of preparing 3-(2,4-diketo-5-phenoxy - 8 - phthalimidooctyl) - 5 - chloro - 4 - quinazolone which comprises contacting 1-phthalimido-4-phenoxy-5-hexanone with ethyl 5-chloro-4-quinazolone-3-acetate in the presence of sodium methoxide.

16. A method of preparing 3-(2,4-diketo-5-phenoxy - 8 - phthalimidooctyl) - 5 - methyl - 4 - quinazolone which comprises contacting 1-phthalimido-4-phenoxy-5-hexanone with ethyl 5-methyl-4-quinazolone-3-acetate in the presence of sodium methoxide.

17. A method of preparing 3-(beta,delta-diketo-delta-2-furylbutyl)-4-quinazolone which comprises contacting 2-acetofuran with ethyl 4-quinazolone-3-acetate in the presence of sodium methoxide.

B. R. BAKER.
M. V. QUERRY.

References Cited in the file of this patent
Beilstein, Vierte Auflage, vol 21, p. 458.